Figure 1:
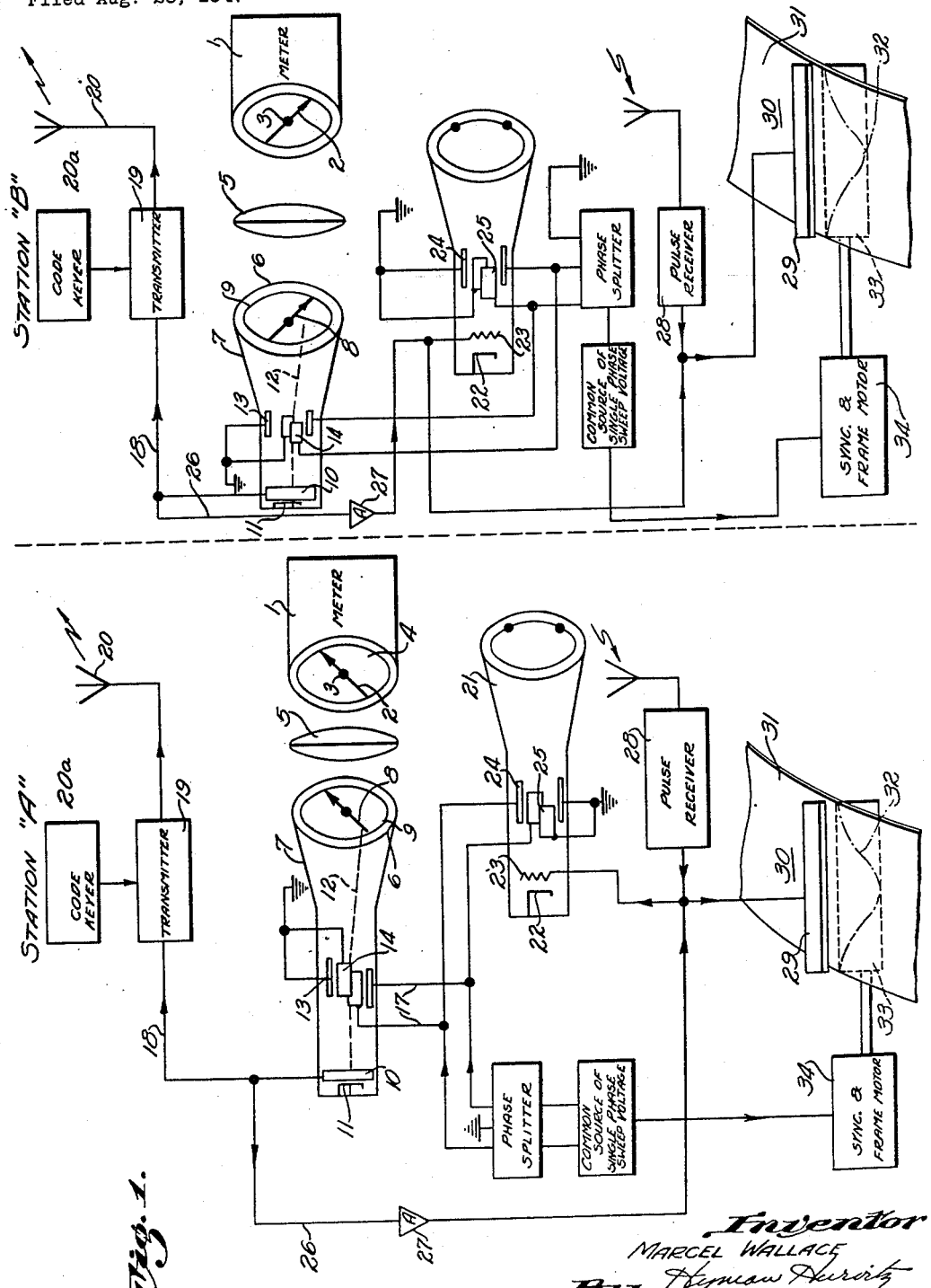

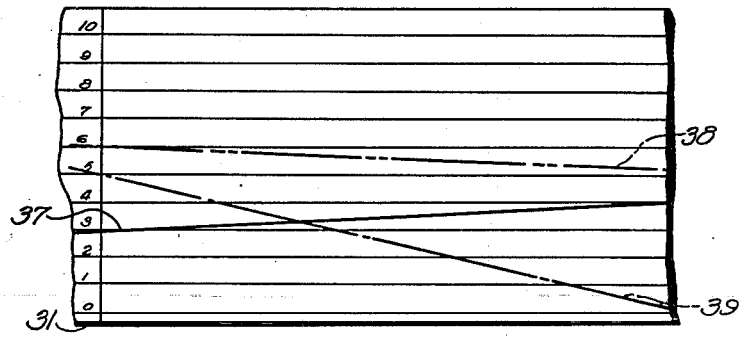
Fig. 2.
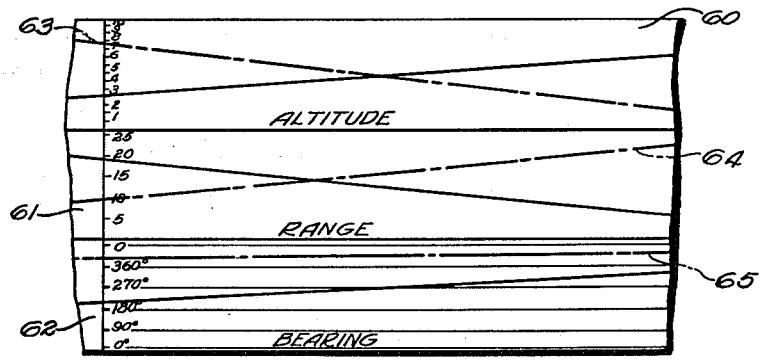
Fig. 4.
Fig. 5.
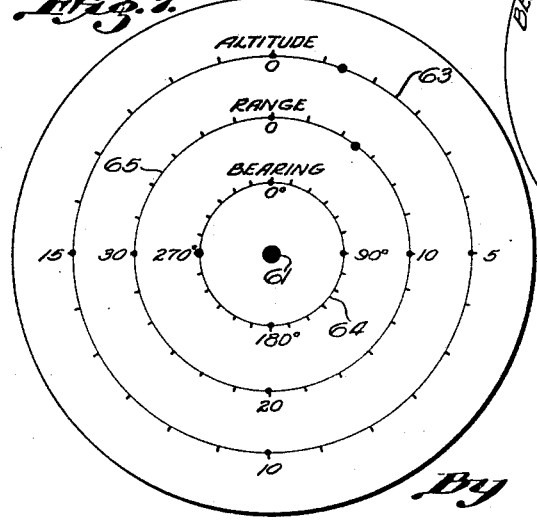
Fig. 7.
Inventor
MARCEL WALLACE
By Hyman Hurwitz
Attorney Jan. 16, 1951    M. WALLACE    2,538,065
SYNCHRONOUS TELEMETRIC SYSTEM
Filed Aug. 26, 1947    5 Sheets-Sheet 3

Inventor
MARCEL WALLACE
By Hyman Hurwitz
Attorney

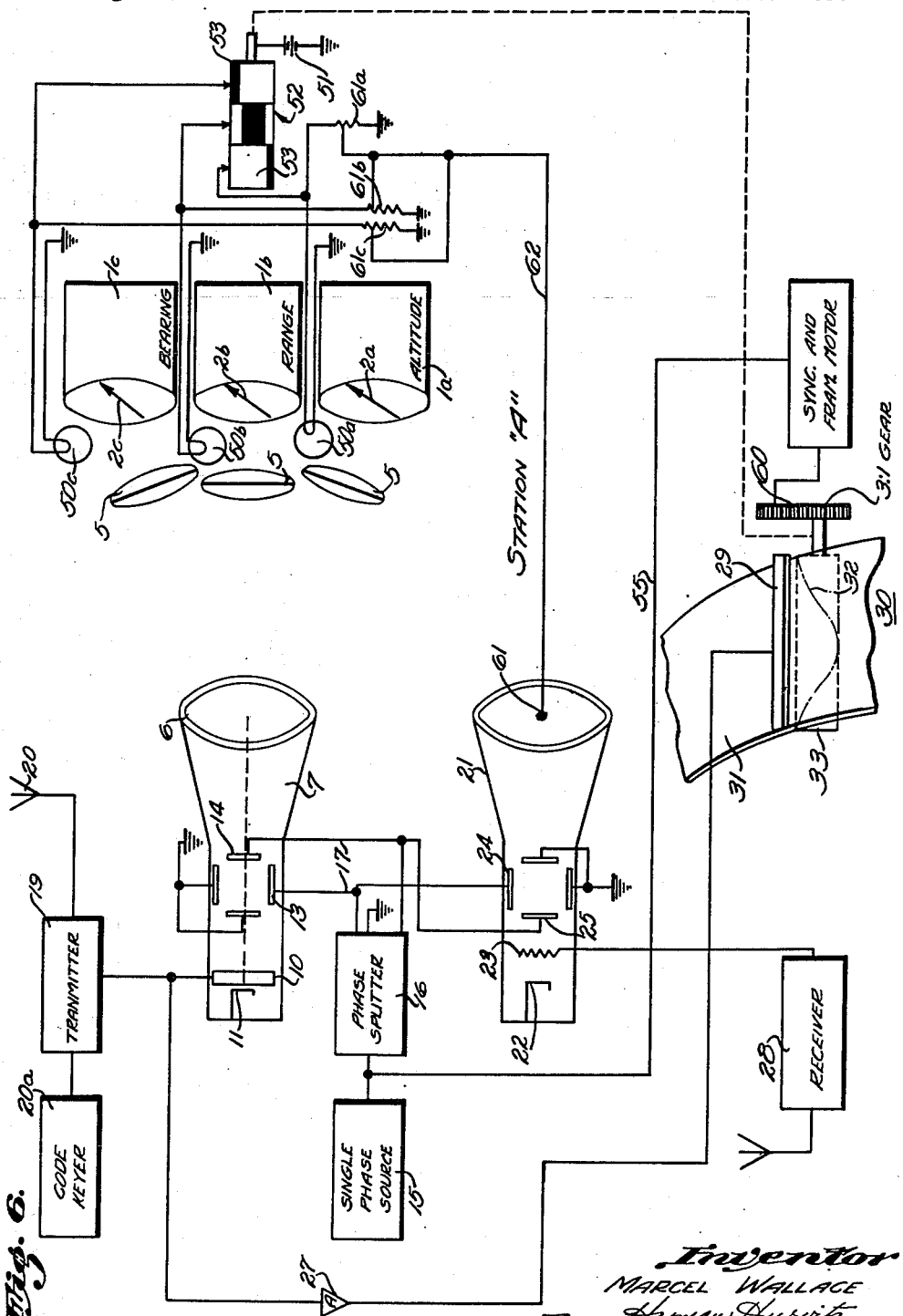

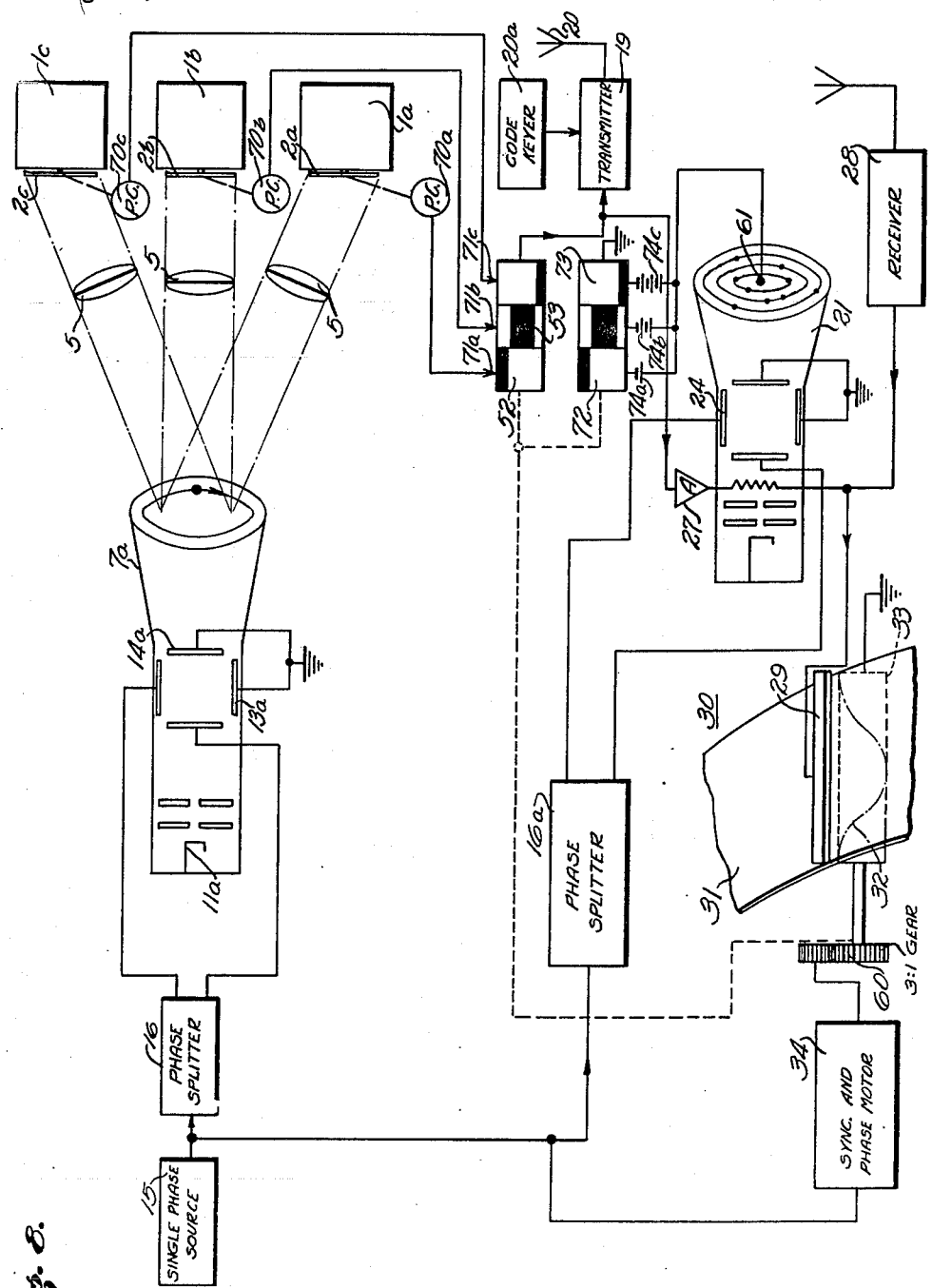

UNITED STATES PATENT OFFICE 2,538,065

SYNCHRONOUS TELEMETRIC SYSTEM

Marcel Wallace, East Portchester, Conn., assignor of one-half to Panoramic Radio Corporation, Mount Vernon, N. Y., a corporation of New York Application August 26, 1947, Serial No. 770,686

2 Claims. (Cl. 177—351)

This application is an improvement on the system disclosed in the application for United States Patent of Marcel Wallace and William Wu, Serial No. 633,138, filed December 6, 1945, and entitled "Panoramic Position Indicators."

This invention relates to telemetering systems of general applications and is particularly useful for providing remote indications of the readings of instruments without requiring modification of the instruments per se.

While a wide variety of telemetering systems has been proposed in the prior art for providing remote indications of the readings of meters, gauges, pointers, and instruments generally, such systems have required, in general, special construction of the meters and instruments involved or at least modifications of these instruments and meters to adapt them for use in the telemetering system. It is highly desirable to provide a telemetering system which is adapted to operate from standard meters and instruments without requiring modification of the meters and instruments in any respect.

It is accordingly an object of the present invention to provide a new and improved telemetering system for giving remote indications of the readings of meters, gauges, instruments, and pointers generally, which is simple and reliable in construction and operation.

It is another object of the present invention to provide a new and improved telemetering system for giving remote indications of the readings of meters, gauges, pointers, and the like which involves no modification of the instruments, meters, and pointers.

It is still another object of the invention to provide a telemetering system which gives on a single indicating instrument the readings of a plurality of remote meters, pointers or the like.

It is a further object of the invention to provide a telemetering system which transmits meter readings from each of a plurality of metering stations to each of a plurality of indicating stations, the readings of each of the meters being provided at each of the stations.

It is still a further object of the invention to provide a telemetering system wherein readings of a plurality of meters may be transmitted to one or more remote points and recorded at each of these points against a time axis.

In accordance with the invention, a sending station in the telemetering system comprises a television pick-up tube such as an iconoscope or the like which provides signals in the form of pulses, timed, with respect to a predetermined zero of time, in accordance with the reading of a meter. Each receiving station is provided with a cathode ray tube indicator for indicating the value of the meter reading and/or with a recording device of the facsimile type for providing permanent time records of the same value. The various television pick-up tubes, cathode ray indicator tubes, and/or facsimile recording equipments utilized in the system may be commonly synchronized, and all transmissions from the telemetering transmitters may occur in such a manner as to be common to all the receiving stations of the system. Thereby all the transmissions from the various transmitting stations may be received at each of the receiving stations and there translated in terms of the time positions of the various signals corresponding with the various meter readings and commonly indicated in such a manner as to permit a visual comparison of the values of the meter readings.

In order to provide for simplification of scanning and synchronization, the various transmitters and receivers of the system may be caused to scan periodically a single reentrant path of simple character such as a circle or a straight line, enabling synchroniztion of all the elements of the system from a single alternating current signal which may be derived from alternating current power lines common to the system or by means of radio transissions. In the latter case, and if the present system is utilized to transmit signals among a group of aircraft, use may be made of transmissions normally presently available at air terminals and which are otherwise transmitted for the purpose of providing the aircraft with omnidirectional beacon signals. In one particular application of the present invention, it is contemplated that each of a plurality of aircraft may be provided with a television type pick-up camera trained on an altimeter carried by the aircraft, the various television pick-up tubes being provided each with a signal scanning trace which describes a path concentric with the axis of pointer rotation of the altimeter. By synchronizing all the scanning traces, the various aircraft will be caused to transmit each a series of periodical pulses, timed, with respect to a zero of time which is common to the entire system, at times representative of the altitudes of the aircraft. Each aircraft may likewise be provided with a cathode ray tube indicator and/or a facsimile type recorder which scans a visual field in synchronism with the scanning action of the television pick-up tubes. The pulses transmitted from the various aircraft may be carried as modulations of common frequency carriers and may be received aboard each of the aircraft and, after detection, applied to the intensity grids of the cathode ray tube indicators and/or to the recording elements of the facsimile receiving equipments. Transmissions from each of the various aircraft may be coded to enable distinction therebetween, and all the altitude representative visual indications thus produced provided in juxtaposition on a single instrument aboard each of the aircraft to inform the pilot thereof concerning the relative altitudes of all adjacent aircraft.

For a better understanding of the present invention together with other and further objects, features, and uses thereof, reference is had to the following detailed description of various specific embodiments of the invention, the description being taken in connection with the accompanying drawings and the scope of the invention being pointed out particularly in the appended claims.

Figure 3:
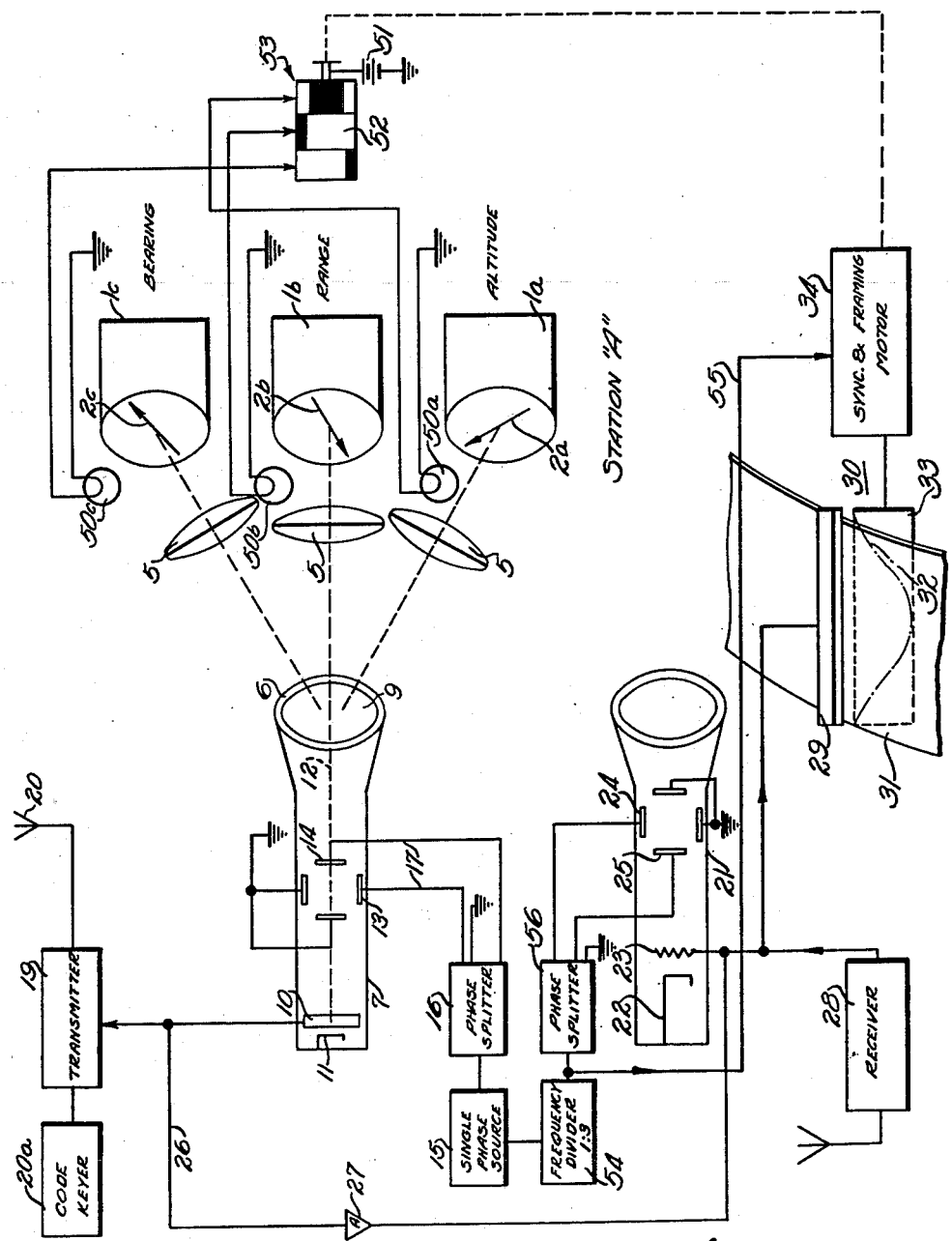

Referring now to the drawings:

Figure 1 is a circuit diagram, partly schematic, of one complete telemetering system embodying the invention; Figure 2 is a plan view showing a portion of a record-receiving strip having thereon a plurality of records as provided in the system of the present invention; Figure 3 represents a further embodiment of the invention illustrated largely in functional block diagram; Figure 4 represents in plan view a portion of a record-receiving strip having thereon records of the type produced by the system of Figure 3; Figure 5 represents in elevation the appearance of the face of the cathode ray tube in the course of indicating the values of telemetric signals derived in the operation of the telemetric system of Figure 3; Figure 6 represents still a further embodiment of the invention; Figure 7 represents the appearance of an indication as provided by the system of Figure 6 on the face of a cathode ray tube indicator; and Figure 8 represents, schematically, a modification of the embodiment of Figure 6.

Referring particularly to Figure 1 of the drawings which illustrates two complete stations A and B of a telemetering system, each station comprises both a transmitter and a receiver, and realizing that the system may comprise any number of such stations, but avoiding illustrating more than two such stations for the sake of simplicity of illustration and explanation, there is illustrated a meter 1, having meter indication pointer 2 which rotates about an axis 3 and which provides a measurement of some physical quantity. The system operates identically regardless of the character of the quantity whose value is transmitted and regardless of the structure and size of the meter involved. The pointer 2 must, however, be optically distinguishable from the face 4 of the meter 1. We may assume, for the sake of example, that the meter face 4 is black or relatively non-light reflecting and that the pointer 2 is white or relatively light reflecting, although reversal of these conditions would serve equally. Light from a source which is not illustrated may impinge on the pointer 2 and the face 4 of the meter 1 and be reflected from the pointer 2 by means of a suitable lens system, indicated schematically as 5, onto the face 6 of a television pick-up tube 7 of any desired character such as an iconoscope, an orthicon, an image dissector or the like, the pointer 2 being represented on the face 6 of the tube 7 as an optical image 8.

The tube 7 is of known character and requires no extended exposition in respect to its structure or mode of operation, except to specify there is available a photo-electric surface 9 adjacent to the face 6 of the tube, a pick-up electrode 10 which gathers the signal from the photo-electric surface 9, a cathode 11, and a suitable electron lens system for providing a beam for electrons 12 and two sets of mutually perpendicular beam deflecting electrodes 13 and 14.

The beam of electrons 12 is caused, by means which will be described hereinafter, to trace out periodically a circular path upon the photo-electric surface 9 and to cause generation of a signal in the electrode 10 each time in the course of its travel that the image 8 is traversed. A source of single phase voltage 15 is provided which may be of any desired character such as an electric power line, or transmissions from an omnidirectional beacon. The single phase voltage 13 may be split by means of phase splitter 16 into two sweep voltages differing in phase by 90 degrees, separate phases being applied over leads 17 to the sets of deflecting elements 13 and 14, respectively, whereby to provide, in known fashion, a circular sweep for electron beam 12.

By providing a common source of single phase sweep voltage for all the scanning elements of the present system, a common time axis is provided for these scanning elements, each having an identical zero of time, to enable a comparison of the times of occurrence of pulses generated by the various television pick-up tubes 7 of the system.

Signals collected by the collector electrode 10 and corresponding with short time pulses generated by traverse of the electron beam 12 across the pointer image 8 are applied over a lead 18 to a radio transmitter 19 and thence radiated by means of a suitable antenna 20 to the various receiving stations of the system. In order to provide for identification of the various transmitters or transmitting stations of the system, each transmitter 19 is provided with a code keyer 20a which interrupts transmissions from the transmitter at a relatively slow rate in accordance with a predetermined sequence which is different for each of the various transmitters of the system.

It is, of course, not necessary that each transmitter of the system be provided with a local indicator for indicating meter readings at various transmitters of the system. However, for at least one preferred use of the present system such provision is desirable, reference being had to transmission of altitude indications from each of a plurality of aircraft flying adjacent to a common geographical location. Accordingly, the system will be described as including a cathode ray indicator and a facsimile type recorder at each telemetric system and it will be realized that those utilizing the system may omit the cathode ray tube indicator or the facsimile receiver or both in accordance with the necessities of particular situations.

Cathode ray tube indicator 21 may be of conventional character, including a cathode 22, an electron lens system (not shown), an intensity grid 23, and two sets of mutually perpendicular deflecting electrodes 24 and 25. Deflecting electrodes 24 and 25 may have applied thereto deflecting voltages in 90 degree phase relation deriving from the leads 17 whereby the electron beam of the cathode ray tube indicator 21 may be caused to traverse a path which is synchronized with and identically phased with the path of electron beam 12 of pick-up tube 7. Signals deriving from the collector electrode 10 from pick-up tube 7 may be applied, over lead 26, by an isolating amplifier 27, to the intensity grid 23 of the tube 21, preferably in such sense as to cause intensification of the beam of the cathode ray tube in response to each pulse signal generated in the collector electrode 10. The electron beam of the tube 21 is normally biased back so as to produce no visible indications, or but faint indications. The time pulses deriving from the collector electrode 10 will therefore intensify the electron beam of the tube 21 at such times and consequently at such points in the scanning path of the beam as are representative of the position of the image 8 and consequently of the meter pointer 2. Pulse transmissions from the transmitters 19 of the system will be received both locally and at remote stations practically simultaneously, by means of receivers 28, where they are amplified and detected. The detected pulse signal is then applied to the intensity grids 23 of the indicating cathode ray tubes 21 of the system, as well as to the marker electrodes 29 of facsimile type recorders 30, provided at each of the stations. The facsimile type recorders 30 include not only a marking electrode 29, but also a time fed record receiving surface 31 and a scanning electrode in the form of a helical conducting ridge 32 disposed about the surface of a cylinder 33, the record receiving surface 31 being disposed between the marking electrode 29 and the scanning electrode 32, and being adapted, in a manner well known per se, to generate a visible mark of permanent character in response to passage of current therethrough. Current is normally applied to marking electrode 29 and passes through record receiving surface 31.

The scanning electrode 32 may be driven by means of a synchronizing and framing motor 34, which derives its operating power from the source of single phase sweep voltage 15, and which is designed and adapted to maintain an unalterable positionable relation with respect to the instantaneous phase of the source 15. Synchronizing and framing motors of this character are well known per se and form, per se, no part of my invention, and accordingly need not be described in detail herein.

By virtue of their operation from a common source of synchronizing sweep voltage, the various image analyzing tubes 7, cathode ray tube indicators 21, and facsimile type recorders 30 of the entire system all operate in synchronism and in time phase. Pulse transmissions from all the transmitters 19 of the entire system are all identically related to the common time scale, having a common zero of time, and accordingly the relative time positions of all the transmitted pulses as indicated on the various cathode ray tube indicators and on the various facsimile receivers are susceptible of comparison and of interpretation and translation into measured values. Transmissions received from one station at another station are coded, which renders them susceptible of identification as to their points of origin. Indications at a local station deriving from the transmitters at that station are uncoded by virtue of the fact that these indications are generated both from transmitted signals received at the local pulse receiver and by transmissions deriving directly from the collector electrode 10 of the position analyzing tube 7, the latter supplying signals while the transmitters 19 are cut off by the code keyers 20.

Reviewing now the operation of the system of Figure 1, an optical image 8 of the position of a meter pointer 2 is impressed on the face 6 of the position analyzing tube 7. The tube 7 generates a pulse which occupies a time position along a time scale, common to the entire system of the invention, which represents the angular position of the image 8, generating this pulse periodically so long as the system is in operation. Generation of the pulse is accomplished by causing an electron beam 12 to scan a photo-emissive surface 9 which is located adjacent to the surface 6, traverse of the image 8 by the beam 12 causing emission of electrons from the surface 9, which are collected by the collector electrode 10. Beam 12 is caused to scan a circular path by means of voltages applied to two sets of mutually perpendicular deflecting electrodes 13 and 14, the rotation of the beams 12 being commonly synchronized and identically phased for all the image analyzing tubes 7 of the entire system, by deriving the sweep voltages of the system from a common source of alternating current signal. The outputs of the electrodes 10 of the various image analyzing tubes 7 are caused to key on transmitters 19 in response to the occurrence of pulse signals, and each transmitter 19 transmits its pulse signals to the other stations of the system.

It will be realized that, while in the specific embodiment of the invention illustrated in Figure 1 transmitter 19 is illustrated as a radio transmitter, this is not an essential feature of the invention, since where the various stations may be connected by means of wires, transmissions may be accomplished over these wires either as alternating current or as direct current pulses.

The various transmitters of the system are keyed by means of code keyers 20a which interrupt transmissions at a slow rate and in accordance with a sequence peculiar to each individual transmitter. A cathode ray tube indicator 21 and/or a facsimile type recorder may be provided at each of the stations of the system for interpreting and indicating and/or recording the time positions of the transmitted pulses. The cathode ray indicator system at each station comprises means for generating a circular trace of electrons, the movement of which is synchronized and phased identically with the movement of the beam 12 of tube 7. Each indicator tube is provided with an intensifying grid which in response to signals derived from its local collector electrode 10 and from its local pulse receiver 28, intensifies the electron beam of the indicator tube and produces a visible spot on the face of the tube, the spots occurring at positions corresponding with the time positions of the locally generated and of the received pulses. Images corresponding with the locally generated signals are unmodulated while those deriving from remote stations are interrupted in a coded sequence.

The facsimile receiver at each station comprises a scanning electrode in the form of a helical ridge 32 which scans across a record receiving surface 31 in synchronism and in time phase with the space scanning action of the beam 12 of tube 7, and with the scanning action of cathode ray indicator tubes 21. Locally generated signals as well as signals received from remote stations are impressed in parallel upon the intensifying grid 23 and upon the marking electrode 29 of the facsimile receiver 30, producing a permanent record on a time fed record receiving surface 31 of the time positions of the various pulses generated by the system which at positions laterally of the surface correspond with visible indications presented on the face of the cathode ray tube indicator 21. By virtue of the permanent character of the record produced by the facsimile receiver 30, the code interruptions of the various signals are retained permanently. A time record is thus available of the various meter readings provided by the stations of the system, not only in respect to their instantaneous or present value, but also in respect to past values, and by reason of the time feeding of the record receiving surface 31, values of rate of change of magnitude of the various quantities measured by the meters of the system become immediately evident.

The system as described hereinbefore is extremely flexible and requires no modification of the meters which are being read, except in that the faces of the meters and the pointers of the meters must be optically distinguishable, a condition which is normally met with in the ordinary commercial meter.

Reference is made to Figure 2 of the drawing, which shows in plan view the appearance of a portion of record receiving surface 31 as created at any one of the stations of the present system, and it will be evident that the record receiving surfaces 31 may be provided with suitable calibrations, which in the present case consist of parallel lines 36 extending longitudinally of the receiving surface 31 and marked in terms of units of magnitude of the quantity being measured. The record provided by the local transmitters is shown as a continuous dark line 37, while the records corresponding with stations originating remotely are interrupted periodically in accordance with an identifying code as evidenced by the lines 38 and 39.

Turning now to Figure 3 of the drawings, a system is illustrated which is in many respects similar to the system of Figure 1 and which utilizes the same principles as have been already explained in the exposition of the system of Figure 1; but which presents the possibility of transmitting data from a plurality of meters instead of from a single meter only, the readings of all the meters being distinguishably presented locally and at remote stations on the face of a common cathode ray tube and/or on the record receiving surface of a common facsimile receiver. Only a single station is illustrated in Figure 3, but it will be realized that any desired number of such stations may be comprised in a system operating in accordance with the invention, the various stations being identical if desired, but the further possibility being envisaged that either the cathode ray tube indicator or the recorder or both may be omitted at some of the stations. Those elements of Figure 3 which are common to it and to Figure 1 have been identified by the same numerals of reference in the several figures.

In general the system of Figure 3 requires that each of the meters being read be maintained in relative darkness and that the meters be illuminated successively during periods adequate for scanning of the pointer positions of the meters by a television type pick-up tube. Successive illumination of the meters is accomplished by a series of lamps, one associated with each of the meters, and which are energized in sequence by means of a commutator which operates to energize each lamp in succession for a period of time occupied by one scanning cycle of the pick-up tube. The indicating cathode ray tube indica-tors of the system are operated from the same source of sweep voltage that is applied to accomplish scanning in the pick-up tubes, but this source is divided as to frequency, in a known manner, and by a factor corresponding with the total number of meters to be read. Thereby, the path traced on the face of the indicator is divided into a series of path segments, each path segment being utilized to display the values of meters of one kind only. Likewise, the scanning electrode of the facsimile recorder is driven from the output of the frequency divider utilized to accomplish scanning of the cathode ray tube indicator. It rotates more slowly than does the scanning beam of the television type pick-up tube by a factor equal to the number of meters being read at any one station. In this manner the time sharing accomplished at the meter reading station is translated into space sharing at the facsimile recorders, each recorder providing laterally displaced sets of meter readings, each set comprising readings of the values of a number of meters of the same kind or occupying identical time positions in the time sharing sequence.

Reference is now made particularly to Figure 3 of the drawings wherein is illustrated a series of meters 1a, 1b, and 1c, the readings of which are to be transmitted to a remote location and there indicated and recorded. While three meters are illustrated, this is for example only, since more or fewer meters may be remotely read in accordance with the present system, by simple modifications thereof which will be obvious to those skilled in the art from the description of the system as hereinafter provided.

The meters 1a, 1b and 1c are normally unilluminated and optical images from the various meters are transferable to the face 6 of the television viewing tube 7 in superposed relation by means of a series of lenses 5. Illumination for the meters 1a, 1b, and 1c is provided by a corresponding plurality of lamps 50a, 50b, 50c, respectively, these lamps being illuminated in succession and periodically from a source of voltage 51 over the three segment commutator 52 having segments 53 which occupy each ⅓ of the periphery of the commutator 52, each of the lamps being connected to one of the segments 53 over a suitable brush.

As in the embodiment of Figure 1, a scanning cathode ray beam 12 of the tube 7 is caused to trace a circular path about the face 6 of the meter 7 by means of a phase-split voltage applied to the deflecting plates 13 and 14 of the tube 7 and derived from a phase splitter 16 which in turn is energized from a source of single phase voltage 15. The source of single phase voltage 15 may be a power line common to all the stations of the system, or single phase voltage may be derived from radio transmissions in accordance with the desired manner of application of the invention. It is desired that the commutator 52 make one complete revolution for each three scanning cycles of the tube 7, each conductive segment 53 of the commutator 52 connecting its associated lamp to the source of voltage 51 during one complete scanning cycle. To this end a frequency divider 54 has its input connected to the source of single phase power 15 and provides in its output a single phase frequency having three times the period of the source 15. The output of the frequency divider 54 is applied over a lead 55 to a synchronizing and framing motor 34 which serves to drive the commutator 53 and which is designed to operate at ⅓ the speed in revolutions per second of the frequency of alternation of the single phase source 15. Since the single phase source drives the scanning beam of the tube 7 over a complete scanning path for each cycle thereof, and since the motor 34, and hence the commutator 52, operate at ⅓ the frequency of the source 15, the commutator makes ⅓ of a revolution for each complete scanning cycle of the beam 12 and maintains the lamps 50a, 50b, and 50c illuminated in succession, each for a period corresponding with one complete scanning cycle of the beam 12. The readings of the meters 1a, 1b, and 1c are therefore analyzed by the viewing tube 7 on a time sharing basis, and the output pulses derivable on the collecting anode 10 of the tube 7 represent in response to their time positions the readings of each of the meters 1a, 1b, and 1c in succession, the sets of readings being repeated periodically.

At each station is provided a cathode ray tube 21, having a cathode 22, focusing electrodes (not shown), an intensity grid 23, and deflecting electrodes 24 and 25. The indicating beam of the cathode ray indicator tube 21 is caused to scan a circular path by means of phase split voltages applied to the deflecting electrodes 24 and 25 from a phase splitter 56 which derives its control voltage from the output of the frequency divider 54. Thereby, the scanning rate of the cathode ray tube 21 is ⅓ that of the viewing tube 7, ⅓ of each complete circular path on the face of the tube being devoted to indicating the reading of a single meter. Voltages derived from collector electrode 10 are applied over a lead 26 and via an isolating amplifier 27 to the intensifying electrode 23 of the tube 21, to cause intensification of the beam of the tube in response to each transmitted pulse. Since the various pulses transmitted to the intensifying grid 23 occur at times corresponding with the readings of the meters 1a, 1b, and 1c, the face of the cathode ray tube 21 will present a series of three dots, each appearing within one 120 degree segment of the face of the tube and the position of each dot within its segment representing the position of one of the meter pointers 2a, 2b, 2c.

We may assume, for one example of a possible use of the present system, that the stations of the system are located aboard aircraft and that it is desired to transmit from each aircraft the readings of meters which indicate bearing, range, and altitude of the aircraft, the meter 1a measuring altitude, the meter 1b measuring range, and the meter 1c measuring bearing. In such a case the face of the cathode ray tube 21 may be calibrated as illustrated in Figure 5 of the drawings, the face of the tube being divided into three segments each occupying 120 degrees of the periphery and a counterclockwise rotation of the scanning beam of the tube 21 as viewed in Figure 4 being assumed, with zero time occurring at zero degrees on the face of the tube. The first segment 57 of the tube face may be calibrated in terms of altitude in units of 1000 feet. The second segment 58 of the tube may be calibrated in miles of range, ranging from zero to 25, and the third segment 29 may be calibrated in degrees of bearing ranging from zero degrees to 360 degrees. The unkeyed or unmodulated spots appearing on the face of the tube represent the altitude, range, and bearing of the transmitting craft. In the present instance, the craft may be seen to be located at 2400 feet altitude, to have a range with respect to an arbitrary reference point of about 10 miles, and a bearing about 150 degrees from that fixed point.

There may be further provided at each station of the present system a facsimile recorder 30 having a recording electrode 29 and a helical ridge 32 on a cylinder 33, the cylinder 33 and its helical ridge 32 being driven by means of a motor 34, which has been referred to hereinbefore in connection with the commutator 52. Since the motor 34 operates from the output of the frequency divider 54, the speed of the rotation of the helical ridge 32 is equal to the speed of rotation of the scanning beam of the tube 21 and is ⅓ the speed of the scanning beam 12 of the viewing tube 7. One complete scan of the ridge 32 laterally on the record receiving surface 31 corresponds, therefore, with the time required for one scanning operation of the meters 1a, 1b, and 1c and the record receiving surface 31 may in fact be considered as composed of three laterally adjacent record receiving strips, the first of which is scanned contemporaneously with the scanning meter 1a, the second of which is scanned contemporaneously with the meter 1b, and the third of which is scanned contemporaneously with the meter 1c. Since the scanning process in the viewing tube 7 is synchronized with the scanning motion of the helical ridge 32, the pulses produced at the collector electrode 10 and applied over lead 26 and via an isolating amplifier 27 to the marking electrode 29, produce marks at positions laterally of the surface 31 corresponding with the time positions of the generated pulses. The record receiving surface 31 may be precalibrated, as shown in Figure 4 of the drawings, into three longitudinally adjacent strips 60, 61, and 62, and a permanent time record is then provided on the separate strips of the readings of the meter 1a, 1b, and 1c, which correspond in our example with the altitude, range, and bearing of the transmitting station.

It will be recalled that each station of the system transmits pulses corresponding in time position with the meter readings exposed to the viewing tube 7. The various stations of the system all transmit in identical fashion, and each station is provided with a receiver 28 for receiving the pulses transmitted by all the various stations of the system. The output of the receiver 28 is connected in parallel to the intensifying grid 23 of tube 21 and also to the marking electrode 29 of the facsimile recorder 30. Since all the stations of the system are identically synchronized and phased, each of the stations transmits in succession readings from the meters 1a, 1b, and 1c, which in the case of our example may correspond with the altitude, range and bearing of an aircraft. Further, the time scale utilized at each of the stations for interpreting the time position of the various pulses in terms of measured values is identical, and accordingly all the indications provided on the face of the cathode ray tube indicator 21 and on the record receiving surface 31 of the facsimile recorder 30 are comparable and represent directly the measured values indicated by the various meters of the system. Identification of the various signals is afforded by the code keyer 20a available at each of the stations and which makes available to each of the stations a distinctive keying sequence for its transmitted signals. Reference is made to Figure 4 whereon is illustrated the appearance of a record corresponding with one received group of signals corresponding with the altitude, range, and bearing of a remote aircraft. It will be noted that the recording 63 corresponding with altitude, the recording 64 corresponding with range, and the recording 65 corresponding with bearing of the remote craft are identically coded, enabling ready correlation of the various recordings. The locally generated signals are recorded without coding, which renders these easily distinguishable from all other recordings.

Figure 5 illustrates the appearance of the face of cathode ray tube indicator 21, the keyed dots representing the instantaneous position of a single remote aircraft in terms of its altitude, range and bearing. The set of keyed dots corresponding with a single transmitter are readily distinguishable and correlatable since they flash on and off in identical rhythm.

Referring now particularly to Figure 6 of the drawings, there is illustrated a single telemetric station which may be one of a number of such stations which together constitute a telemetric system. The station illustrated in Figure 6 represents a variation of that illustrated in Figure 3, differing therefrom primarily in respect to the character of the indications provided on the face of the cathode ray tube 21. In the embodiment of Figure 3 the indications provided by distinct meters are indicated on separate angular segments of the face of a cathode ray tube, as illustrated in Figure 5 of the drawings. In the embodiment Figure 6, on the other hand, the readings of separate instruments are indicated on circular traces of different radius on the face of the cathode ray tube indicator. In other respects the embodiments of Figures 3 and 6 are identical, and accordingly the same numerals of reference have been applied to corresponding elements in the separate figures, and Figure 6 will be described only in respect to those features by virtue of which it differs from Figure 3.

It will be recalled that in the embodiment of Figure 3 the drive motor 34 of the facsimile recorder 30 is driven from the output of a frequency divider in order to reduce its speed by a factor equal to the total number of meters which are to be read at any one station, and to enable contiguous recordings of distinct quantities on a space-sharing basis. In the embodiment of Figure 6, on the other hand, the motor 34 which drives the helical platen 32 of the facsimile recorder 30 is driven directly from the single phase source 15 and its speed is reduced by a factor corresponding with the total number of meters being read at the station by means of a speed reduction gear 60.

In the system of Figure 6 no frequency divider is utilized, the scanning rate at the cathode ray tube oscilloscope 21 being equal to that of the pick-up tube 7, the deflecting electrodes 13 and 14 of the tube 7 and the corresponding electrodes 24 and 25 of the tube 21 being connected parallel to the output of the same phase splitter 16. In order to provide discrimination between indications of quantities of different character and originating from distinct meters, a radial deflection electrode 61 is provided in the cathode ray tube 21 which modifies the radius of the circular trace generated by the cathode ray beam of the tube in acordance with the magnitude of a control voltage applied to the electrode 61. The commutator 62 is utilized to provide a sequence of control voltages for the electrode 61 which vary in magnitude in steps, at times corresponding with the change-over times of meter reading, as provided by the commutator 52.

In particular, each of the energizing circuits of the lamps 50a, 50b and 50c is paralleled by a potentiometer. The potentiometers may be identified by the numerals 61a, 61b, and 61c. The variable taps of the potentiometers 61a, 61b and 61c are tied together and connected over a lead 62 with the radial deflection electrode 61. Thereby the voltage applied to the electrode 61 from each of the potentiometers 61a, 61b and 61c may be varied and adjusted at will by changing the position of the potentiometer contact, and the radial positions of the radius corresponding with any of the meters 50a, 50b and 50c may be varied and selected at will.

The arrangement adopted provides an electrical interconnection between the various lamps 50a, 50b and 50c at all times regardless of the position of the commutator 52. It is essential, however, that the lamps be caused to provide illumination in sequence and that only one lamp be illuminated at any one time. To this end the resistance of each of the potentiometers 61a, 61b and 61c may be made relatively high and the taps adjusted for a position of relatively low voltage. In this way the transfer of voltage from one potentiometer to another by reason of their common tie with the line 62 remains of insufficient magnitude to effect lamp illumination.

Reference is now made to Figure 7 of the drawings wherein is illustrated the appearance of the face of the cathode ray tube indicator 21. The face of the indicator 21 is shown calibrated in three concentric circles of differing radii, each circle having thereon a pair of indications, one deriving from the local station and the other from a remote station. The outer circle 63 represents altitude, in our example, the inner circle 64 represents bearing, in our example, and the intermediate circle 65 represents range; or what amounts to the same thing, the outer circle represents readings of the meter 1a and of remote meters similar thereto, the inner circle of the meter 1a and of remote meters similar thereto, and the intermediate circle of the meter 1b and of remote meters similar thereto. The outer circle may be calibrated in units of thousands of feet from zero to 20, the inner circle may be calibrated in degrees of bearing from zero to 360 degrees, and the intermediate circle may be calibrated in miles of range from zero to 20, when the system is utilized for transmitting navigational information from each of a plurality of planes to the remaining planes of said plurality. For transmitting quantities of a different character, it will be obvious that different calibrations will be adopted.

The system of Figure 6 represents merely one possible variation of the system of Figure 3, and one which has certain advantages over the system of Figure 3 in that crowding of scales is avoided, the systems being in other respects equivalent.

While the various embodiments of the invention heretofore described in detail have involved use of an iconoscope or its equivalent as the meter reading instrumentality, such use is not esential, being advantageous primarily because it is extremely flexible and involves no moving contacts or mechanical parts. An alternative technique which is available involves use of a cathode ray tube oscilloscope having a short persistence screen as the meter reading instrumentality. In the latter system the cathode ray tube is utilized to provide a rotating spot of light which may be impresed upon the faces of a plurality of meters having light reflecting pointers and light non-reflecting faces. Upon passage of the moving light beam through the position of the meter pointer, reflection of the light beam takes place, the reflected light being used to energize a photo-electric cell multiplier which in turn provides output voltage pulses. The outputs of the photo-electric cells may be utilized in much the same manner as were the output pulses of the iconoscope in the various embodiments of the invention heretofore described.

Reference is now made particularly to Figure 8 of the drawings wherein is illustrated schematically an embodiment of the present invention which utilizes the so-called "flying spot" technique. The system of Figure 8 is in general identical with that of Figure 6, and corresponding elements in the two figures have been accordingly identified by corresponding reference numerals. For purposes of brevity, the entire system of Figure 8 is not described, reference being made to the description of Figure 6 to complete the description of the embodiment of Figure 8.

In Figure 8 the iconoscope 7 of Figure 6 is replaced by cathode ray tube 7a having deflecting electrodes 13a and 14a, which correspond with the deflecting electrodes 13 and 14 of Figure 6, and which are energized by phase-splitting voltages derived ultimately from a single phase source 15. The structure illustrated in Figure 8 represents one station of a complete telemetric system, the source 15 being common to all the stations of the system in order to provide a common time base for these stations. As has been explained hereinbefore, and for purposes of exemplification only, the source 15 may represent the output of a radio receiver which translates radio transmissions carrying a suitable modulation frequency or the source 15 may represent a 60-cycle power line commonly available to all the stations of the system. The voltages applied to the electrodes 13a and 14a cause rotation of the electron beam of the cathode ray tube 7a at a frequency and in a phase coresponding with the frequency and phase of the source 15, and which is common to all the stations of the system. The fluorescent screen of the cathode ray tube 7a possesses the property of extremely short persistence, so that immediately upon transfer of the electron beam of the tube from one position to another position on the face of the tube, the emission of light from the first position ceases. In this manner a rotating spot of relatively intense light may be produced, which is visible through a relatively wide angle. A series of lenses 5 is provided for collecting light from the cathode ray tube 7a and for collimating the light energy from the tube into a series of parallel paths which may be impressed upon the faces of the meters 1a, 1b and 1c, respectively. The faces of the meters 1a, 1b and 1c are rendered non-light reflecting in any convenient manner; the pointers 2a, 2b and 2c of the meters 1a, 1b and 1c, respectively, on the other hand, are rendered light reflecting in any convenient manner. One simple way of accomplishing the above is to cover the pointers 2a, 2b and 2c with white enamel and the faces of the meters 1a, 1b and 1c with lamp black or other dark coating. Adjacent the meter faces of the meters 1a, 1b and 1c are provided a series of photo-electric cells 70a, 70b and 70c which are properly oriented each to receive reflected light from one of the meters 1a, 1b and 1c.

The utilization of the structure described immediately hereinabove enables accomplishment of the following functions. As the spot of light provided by the cathode ray tube 7a rotates in precise synchronism with the voltage of the source 15, a correspondingly moving spot of light is impressed upon each of the faces of the meters 1a, 1b and 1c. Upon passage of the light spot associated with each of the meters across the pointer of that meter, luminous energy is transiently impressed upon the photo-electric cell associated with that meter, producing an optical pulse of voltage. The time of occurrence of each of the pulses from each of the meters is in direct correspondence with the angular position of the meter pointer of that meter.

As in Figure 6, a commutator 52 is provided to enable pulses deriving from the various meters to be transmitted, in sequence, on a time-sharing basis. The commutator 52 has been described hereinbefore, but its application in Figure 8 is slightly different than its application in Figures 3 and 6. The three 120-degree conducting segments 53 of the commutator 52 in Figure 8 are used to segregate the outputs of the photo-electric cells 70a, 70b and 70c on a time-sharing basis, the commutator being driven from the shaft of the facsimile recorder 30 and being thereby properly phased to accomplish its object, and the outputs of the photo-electric cells 70a, 70b and 70c being applied to the separate commutator segments 53 over separate brushes 71a, 71b and 71c. The common terminal of the commutator is then applied to the transmitter 19 to control its pulsing. In order to provide for distinctive presentations of the meter readings on the face of the oscilloscope 21, a further commutator 72 is provided which is in all respects identical with commutator 52 and which is driven from the same shaft as the commutator 52. The common terminal of the commutator 72 may be grounded and each of the conducting segments 73 utilized to impress on the radial deflecting anode of the oscilloscope 21 a voltage of different magnitude, which may be derived from a plurality of voltage sources conventionally illustrated and identified by the reference numerals 74a, 74b and 74c. In consequence, the display provided on the face of the oscilloscope 61 will correspond with that illustrated in Figure 7, and which is produced by the embodiment of the invention illustrated in Figure 6. Likewise the recordings provided on the facsimile recorder 30 of the present system will be identical with those produced in the embodiment of the invention illustrated in Figure 6, an example of such a record being provided in Figure 4 of the accompanying drawings.

While I have described two specific embodiments of my invention, it will be clear to those skilled in the pertinent art that modifications and variations of the combinations disclosed and of the details thereof may be resorted to without departing from the true spirit and scope of the invention, the latter being particularly pointed out in the appended claims.

What I claim and desire to secure by Letters Patent of the United States is:

1. In combination, a plurality of meters each having a meter face and a pointer movable with respect to said meter face, said meter face and said pointer having distinguishable light reflective properties, means comprising a single cathode ray tube having a photo-electric mosiac for scanning simultaneously the loci of possible positions of all said pointers, and means for illuminating said meter faces successively, said meter faces being normally unilluminated.

2. In a telemetric system having a transmitting station and a receiving station, means for establishing a common time cycle for each of said stations, a plurality of positionable pointers at said transmitting station, means at said transmitting station for scanning during each of said time cycles loci of possible positions of all said pointers simultaneously, said last named means comprising a cathode ray tube having a photo-electric mosiac and means for impressing images of said pointers on said photo-electric mosiac, means responsive to each coincidence between the instantaneous position of said means for scanning and the position of said pointers, taken one at a time in sequence, for generating a signal, said last named means comprising means for illuminating said pointers sequentially, said pointers normally being maintained unilluminated, means for transmitting said signals, a receiving station comprising a scanning indicator, means for synchronizing scanning of said indicator with said common time cycle, a receiver for said transmitted signals, and means responsive to reception of said transmitted signals by said receiver for actuating said scanning indicator to provide an indication of the time positions of said signals.

MARCEL WALLACE.

REFERENCES CITED

The following references are of record in the file of this patent:

UNITED STATES PATENTS

| Number | Name | Date |
| --- | --- | --- |
| 1,660,886 | Randall | Feb. 28, 1928 |
| 2,110,746 | Tolson | Mar. 8, 1938 |
| 2,148,954 | Methlin | Feb. 28, 1939 |
| 2,402,688 | Shurnick | June 25, 1946 |
| 2,412,094 | Moynihan | Dec. 3, 1946 |
| 2,415,981 | Wolff | Feb. 18, 1947 |